United States Patent
Kim

(10) Patent No.: US 7,474,990 B2
(45) Date of Patent: Jan. 6, 2009

(54) TIMING ERROR DETECTOR FOR VESTIGIAL SIDE BAND (VSB)

(75) Inventor: Joon Tae Kim, Seoul (KR)

(73) Assignee: Techwell, Inc., San Jose, CA (US)

( * ) Notice: Subject to any disclaimer, the term of this patent is extended or adjusted under 35 U.S.C. 154(b) by 0 days.

(21) Appl. No.: 11/537,558

(22) Filed: Sep. 29, 2006

(65) Prior Publication Data

US 2007/0088515 A1 Apr. 19, 2007

Related U.S. Application Data

(60) Provisional application No. 60/722,345, filed on Sep. 29, 2005.

(51) Int. Cl.
  G06F 11/30 (2006.01)
  G06F 15/00 (2006.01)
  G21C 17/00 (2006.01)
(52) U.S. Cl. .................... 702/185; 702/79; 702/89; 714/55; 714/100; 329/357; 455/47; 455/204
(58) Field of Classification Search ............. 702/79, 702/89, 125, 176, 187, 185; 714/55, 100; 329/357, 347; 332/170, 149; 455/46, 47, 455/109, 204; 375/270; 700/306; 386/13, 386/85
See application file for complete search history.

(56) References Cited

U.S. PATENT DOCUMENTS 4,730,345 A * 3/1988 Reeve, III ............. 375/321
5,793,821 A * 8/1998 Norrell et al. ............. 375/355
6,937,666 B2 * 8/2005 Pasternak et al. .......... 375/272
7,110,475 B2 * 9/2006 Jun ........................... 375/326
2002/0071053 A1 6/2002 Wittig
2004/0258180 A1 12/2004 Liu et al.

OTHER PUBLICATIONS

Kelliher et al., A Digital Vestigial-Sideband (VSB) Channel Decoder IC for Digital TV (DTV), 1999, IEEE Publication, pp. 194-195.*

(Continued)

Primary Examiner—Edward Raymond
Assistant Examiner—Elias Desta
(74) Attorney, Agent, or Firm—Pillsbury Winthrop Shaw Pittman LLP

(57) ABSTRACT

The present invention provides a novel symbol timing recovery method for VSB receivers. Systems are described that comprise a timing error detector (TED) that produces an exact symbol timing error even in the presence residual carrier phase offset, loop filter that controls the characteristics of acquisition and tracking of digital PLL loop, Voltage/Numerically Controlled Oscillator (VCO/NCO) that adjusts the sampling instant and phase, A/D converter that samples a continuous VSB input signal, and a interpolating squared root raised cosine filter that performs both matched filtering and a compensation of constant timing offset of quarter symbol caused by the invented TED. The timing error detector in this invention comprises an envelope detector, band pass filter, squaring block, high pass filter, and decimator. It uses both in-phase and quadrature-phase component of received VSB signal, is operated at twice of a symbol frequency F, and guarantees consistent symbol timing error signal resulting in the improvement of receiver's performance.

24 Claims, 11 Drawing Sheets

OTHER PUBLICATIONS

Bao, J., et al., "A New Timing Recovery Method for DTV Receivers," IEEE Trans. Consumer Elec., p. 1243-1249, (Nov. 1998).

Gardner, F.M., "A BPSK/QPSK Timing-Error Detector for Sampled Receivers," IEEE Trans. Comm., p. 423-429, (May 1986).

Kim, K., et al., "A Symbol Timing Recovery Using the Segment Sync Data for the Digital HDTV GA VSB System," IEEE Trans. Consumer Elec., p. 651-656, (Aug. 1996).

* cited by examiner

SRC Filter with 2 times oversampling and interpolation

TIMING ERROR DETECTOR FOR VESTIGIAL SIDE BAND (VSB)

CROSS-REFERRENCE TO RELATED APPLICATIONS

The present application claims priority from provisional patent application No. 60/722,345, entitled "CARRIER PHASE INDEPENDENT SYMBOL TIMING RECOVERY METHODS FOR VSB RECEIVERS," filed Sep. 29, 2005 and which is incorporated herein by reference and for all purposes.

BACKGROUND OF THE INVENTION

1. Field of the Invention

The present invention relates to a digital TV receiver, and more particularly to a robust symbol timing recovery system for Vestigial Side Band ("VSB") receivers where symbol timing is recovered regardless of carrier phase offset or jitter caused by imperfect carrier recovery 2. Description of Related Art The ATSC: A/53 Digital Television Standard, was developed by the "Digital HDTV Alliance" of U.S. television vendors, and has been accepted as the standard for terrestrial transmission of HDTV signals in the United States. The ATSC A/53 standard is based on an 8-level vestigial sideband (8-VSB) modulation format with a nominal payload data rate of 19.4 Mbps in a 6 MHz channel. Synchronization including timing and carrier recovery are essential parts in extracting the transmitted symbols from the received signal. In the 8VSB-T transmission system, a pilot signal is added to help the receiver with the carrier recovery (CR). Usually in a VSB receiving system, symbol timing recovery (TR) is accomplished jointly with CR or follows the CR. During synchronization, the residual carrier phase offset and/or jitter often passes through the CR block and degrades the performance of the TR block (and consequently the overall receiver performance).

Unlike VSB systems, a receiver for QAM does not suffer from this phenomenon because symbol information is conveyed independently through the in-phase (I) and quadrature-phase (Q) channels. The well known TR methods such as spectral line extraction or Gardner's algorithm use both channels (I&Q phase) simultaneously canceling out the carrier phase term. However in VSB systems, symbol information is mainly contained in I channel. The Q channel, which is just a Hilbert transform of the I channel, is employed in order to reduce the transmission bandwidth. Thus, the timing information contained in I and Q channels are not independent of each other, making it impossible to cancel out the phase offset term while extracting timing error information with a conventional TR method.

For this reason, most VSB receivers use only the I channel signal for symbol timing recovery. This works well when the carrier phase offset does not exist or is negligible, but is otherwise highly problematic. Thus, a need exists for a robust timing error detection scheme for VSB receivers that can generate exact tuning errors regardless of carrier recovery status. According to the prior art, as described above, the performance of VSB receivers would undergo a degradation when carrier recovery is not accomplished perfectly.

BRIEF SUMMARY OF THE INVENTION

Aspects of the present invention resolve many of the problems identified in the prior art. In one embodiment, a timing recovery system comprises an A/D converter that samples the incoming analog IF signal modulated by an ATSC VSB system, a phase splitter that regenerates a quadrature-phase signal from an incoming in-phase sampled signal resulting in a complex pass band VSB signal, a carrier recovery system that down converts the pass band spectrum of sampled signal to baseband, and a Timing Error Detector (TED) that produces an exact timing error even in the presence of carrier phase offset/jitter, a loop filter with proportional gain and integral gain parameters, D/A converter that converts the loop filter output signal into an analog control voltage for Voltage Controlled Crystal Oscillator (VCXO), a VCXO which determines the sampling instants according to the control voltage, an interpolating Square root Raised Cosine filter (SRC) that performs both matched filtering and compensation of constant timing offset of quarter symbol caused by the presenting TED.

In another embodiment of the invention, a timing recovery system comprises an A/D converter that samples the incoming analog IF signal modulated by the ATSC VSB system at a fixed sampling rate, a digital interpolator that produces interpolated outputs between received A/D samples according to the offset signal provided by a Numerically Controlled Oscillator (NCO), a phase splitter that regenerates a quadrature-phase signal from an incoming in-phase sampled signal resulting in a complex pass band VSB signal, a carrier recovery system that down converts the pass band spectrum of sampled signal to baseband, a timing error detector that generates a consistent timing error signal regardless of carrier phase offset, a loop filter with proportional gain and integral gain parameters, NCO which determines the interpolation instants and makes the offset signal for the digital interpolator and interpolating SRC filter that compensates for a constant quarter symbol phase offset.

In another embodiment of the invention, a timing recovery system comprises an A/D converter that samples the incoming analog IF signal modulated by the ATSC VSB system at a fixed sampling rate, a phase splitter that regenerates a quadrature-phase signal from an incoming in-phase sampled signal resulting in a complex pass band VSB signal, a carrier recovery system that down converts the pass band spectrum of the sampled signal into a baseband, a digital interpolator that produces interpolated outputs between received A/D samples according to the offset signal provided by an NCO, a timing error detector that generates consistent timing error signal regardless of carrier phase offset, a loop filter with proportional gain and integral gain parameters, NCO which determines the interpolation instants and makes an offset signal for the digital interpolator, and interpolating SRC filter that compensates for a constant quarter symbol phase offset.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 1:
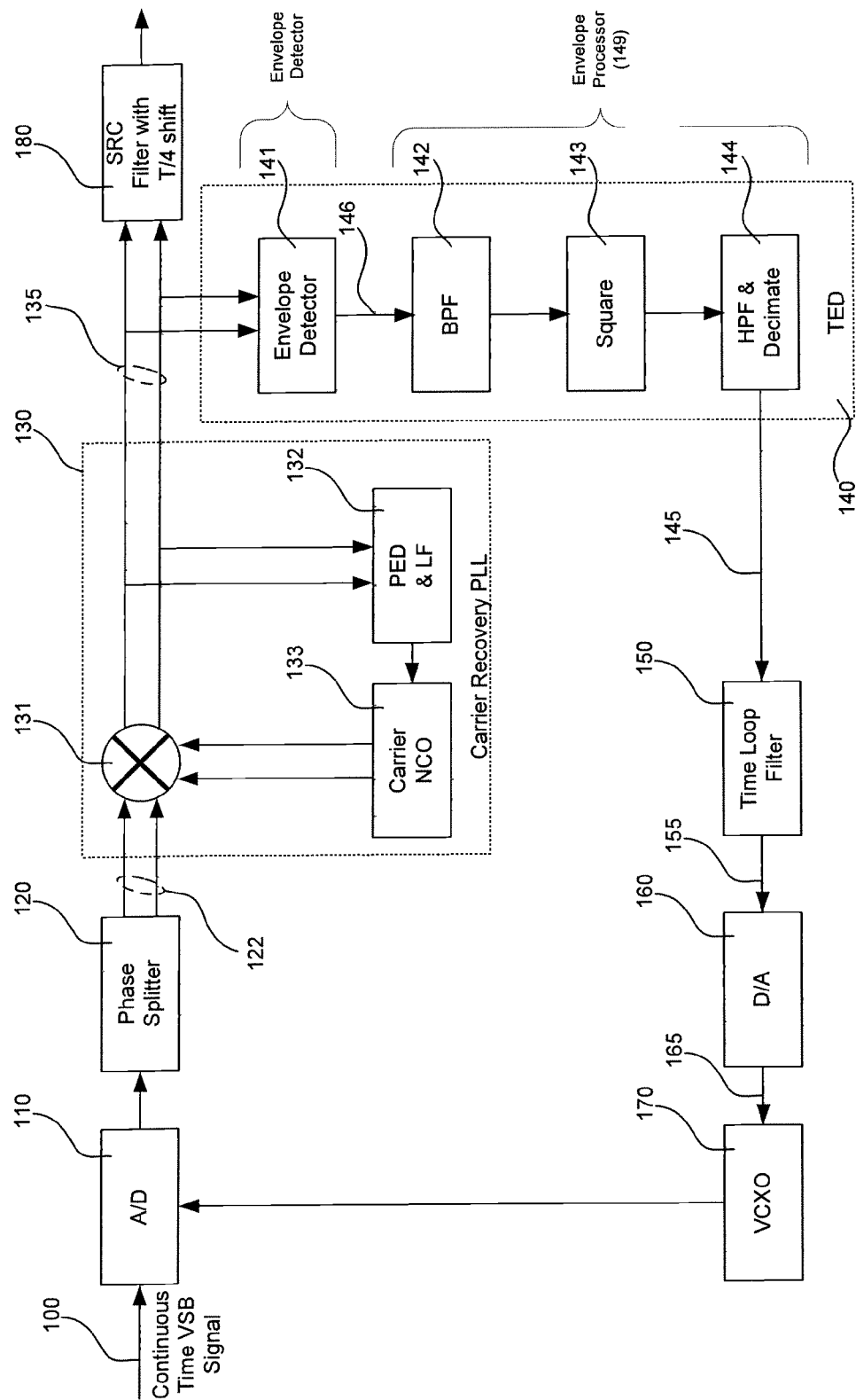
FIG. 1 is a diagram illustrating the general configuration of a symbol timing recovery system for a VSB signal according to one embodiment of the present invention where the sampling instants are controlled in the analog domain using a VCXO.

Certain embodiments of the invention comprise a VSB receiver system such as illustrated in simplified block diagram form in FIG. 1, includes a timing error detector (TED) 140 that performs a key role for robust timing recovery, In order to assist one of skill in the art to better understand certain aspects of the present invention, the derivation of TED 140 is provided and the insensitive feature of the TED 140 for carrier phase offset is also addressed. An equivalent VSB baseband signal, say r(t). can be written as:

$$r(t) = \sum_m x_m p_r(t - mT) + n(t) \quad (1)$$

where $x_m$ is a transmitted symbol, $p_r(t)$ is an impulse response of the complex pulse shaping filter for VSB modulation. T is a symbol period, and n(t) is a colored noise filtered by an analog channel filter, respectively. Assuming data symbol $x_m$ is white and defining the energy of r(t) as v(t), i.e. $v(t)=|r(t)|^2$, $E\{v(t\}$ can be simplified as:

$$E\{v(t)\} = \sigma_s^2 \sum_m p_r|t - mT|^2 + \text{noise term} \quad (2)$$

where $\sigma_s^2$ is an averaged symbol power of $x_m$ and $E\{.\}$ is an expectation operation. Using the Poisson's sum formula, which relates the Fourier series of a summation-formed signal with its Fourier transform, the summation in (2) can be represented as $$\sum_m p_r|(t - mT)|^2 = \frac{1}{T}\sum_n Z\left(\frac{n}{T}\right)e^{j2\pi nt/T} \quad (3)$$

$$Z\left(\frac{n}{T}\right) = \int_{-\infty}^{\infty} P_r(f)P_r\left(f - \frac{n}{T}\right)^* df \quad (4)$$

and * operation in (4) is a complex conjugate operation. Considering (4) carefully, it is easily seen that the coefficient Z(n/T) indicates spectral overlap formed by $P_r(f)$ and its n/T-shifted version in the frequency domain.

Figure 2A:
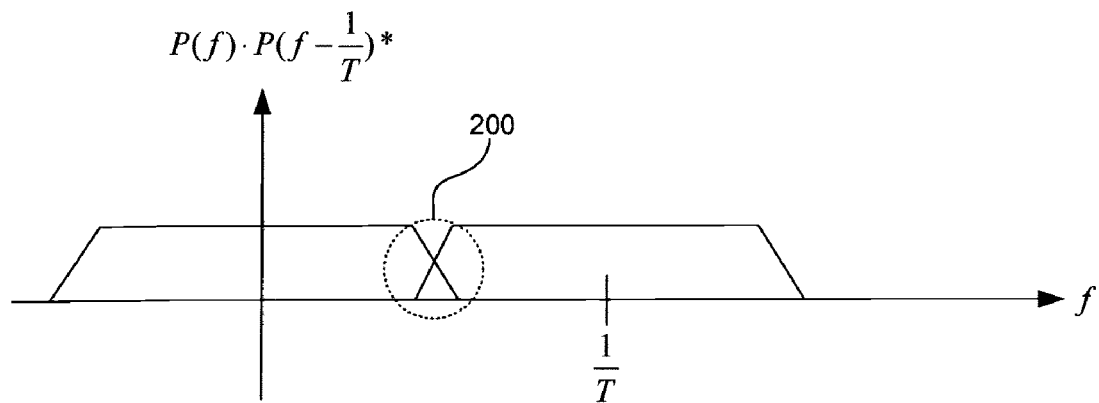
FIGS. 2A, 2B, and 2C are diagrams illustrating spectral overlap for a double sideband (DSB) energy signal, VSB energy signal, and squared VSB energy signal, respectively.
Figure 2B:
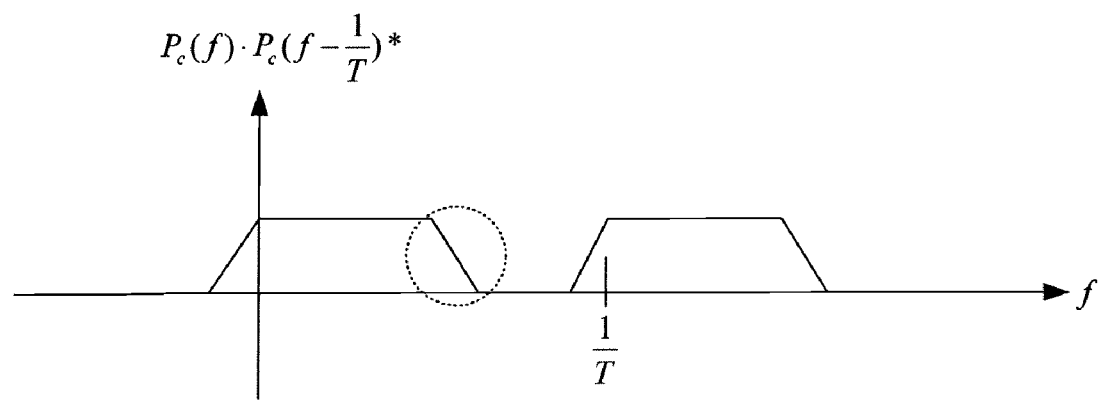

In certain double sideband (DSB) complex modulation systems such as QAM or QPSK, Z(n/T) are all zero except for n=−1, 0, 1. This means the summation in (3) has only three spectral components, one for DC and two others for $e^{\pm j2\pi t/T}$, respectively. Therefore a simple conjugate squaring operation of the complex baseband signal can generate a timing tone $e^{\pm j2\pi t/T}$ at the symbol timing frequency $F_s=1/T$, whose power is determined by the area of overlapped region. FIG. 2A is a diagram illustrating an example of spectral overlap 200 for n=1, where P(f) is the frequency response of a DSB pulse shaping filter, However, in a VSB system, where the spectrum is almost half of DSB system, there is no overlap region for n=1 or n=−1 causing Z(n/T) to be zero except for n=0. FIG. 2B illustrates an example of a spectral overlap diagram for n=1 in a VSB system where $P_c(f)$ is the frequency response of complex VSB pulse shaping filter.

Accordingly, conventional methods that work well in symbol timing recovery for DSB receiver systems may not be directly applied to VSB systems. The phenomenon can also be explained in the time domain. The in-phase and quadrature phase timing errors derived from squaring each channel of a received VSB signal are identical but have reverse polarity. Addition of these two signals forces the resultant timing error to be zero regardless of whether actual errors exist. For at least this reason, most VSB receivers only use one channel signal, which can be a DSB signal, to generate a symbol timing tone which may sometimes suffer from a degradation in TR performance caused by a carrier phase offset.

Now, in more detail, although squared signal v(t) may not have any symbol frequency components as described above, typically, it also does not have any phase offset component because any possible carrier phase offset present in the received signal r(t) is cancelled out. Furthermore, v(t) becomes a double sideband signal. Therefore we can regard v(t) as merely a new received real signal modulated by a PAM system. Some manipulation of $E\{v(t)^2\}$ shows:

$$E\{v(t)^2\} = 2\sigma_s^4 \sum_m p_r|(t-mT)|^4 + \text{noise term} \quad (5)$$

By comparing (5) to (3) we see that $E\{v(t)^2\}$ is also a periodic signal with a period T. Using the Poisson's sum formula again, the summation in (5) can be expressed as:

$$\sum_m p_r|(t-mT)|^4 = \sum_m w(t-mT)^2 = \frac{1}{T}\sum_n Z'\left(\frac{n}{T}\right)e^{j2\pi nt/T}, \quad (6)$$

where:
$w(t) = |p_r(t)|^2$ $$Z'\left(\frac{n}{T}\right) = \int_{-\infty}^{\infty} w(f)w\left(\frac{n}{T}-f\right)df \quad (7)$$

Figure 2C:
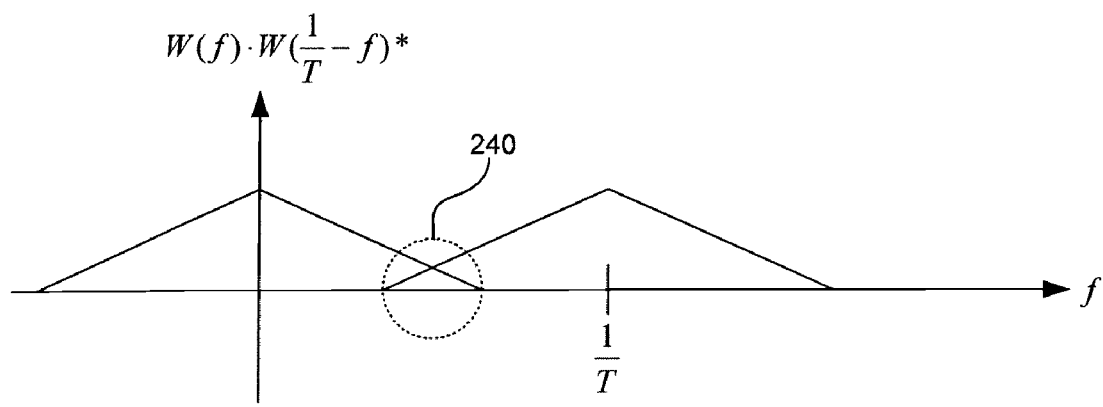

As illustrated in FIG. 2C, there typically exists an overlap region 240 between W(f) and W(1/T−.f) that generates non-zero frequency components at $e^{\pm j2\pi t/T}$ as well as the DC component in equation (6). The DC component can be removed by simple high pass filtering of $v(t)^2$ and the resulting symbol timing tone can be used after a decimation as a measurement of the accuracy of the current timing phase. In summary, the timing error detection can be achieved by first computing the energy signal v(t) of received baseband signal r(t), optionally band-pass filtering the received baseband signal in order to reject the noise component in (2), squaring cascaded by high-pass filtering, and final decimation by a factor of two. In practice, the expectation operation in (5) is typically replaced with a time average, and the noise term expressed in (2) and (5) can be rejected by proper loop filtering in a closed digital PLL system. Several configurations of a timing recovery system for VSB are possible. Most common configurations employ the TED 140 as presented below.

Scheme 1: Timing Recovery System with VCXO

Continuing with FIG. 1, which shows an implementation of one example of an embodiment of the present invention that adjusts the sampling phase in the analog domain using VCXO 170. Continuous time signal 100 is sampled by A/D converter 110 at the frequency of $2F_x$, where $F_x$ is the symbol frequency of the digital pass-band signal. Phase splitter 120 can regenerate the quadrature-phase signal by the Hilbert transform of the received in-phase signal. The output 122 of phase splitter 120, which is a complex pass-band signal, is converted down to a baseband signal through the closed loop carrier recovery system 130.

The carrier recovery PLL system 130 comprises phase error detector and loop filtering block (PED/LF) 132 and a Numerically Controlled Oscillator (NCO) 133 whose output is a complex exponential signal. The output of multiplier 131 is fed again into PED/LF 132 to generate a residual phase error. Carrier recovered baseband signal 135, output of 130, can be input to TED 140 to detect the error signal proportional to symbol timing mismatch. TED 140 comprises an envelope detector 141 and an envelope processor section 149 configured as four cascaded blocks: envelope detector 141, and envelope processor section 149 section band-pass filter 142, squaring operation 143, and high-pass filtering & decimation by a factor of two 144.

Figure 3:
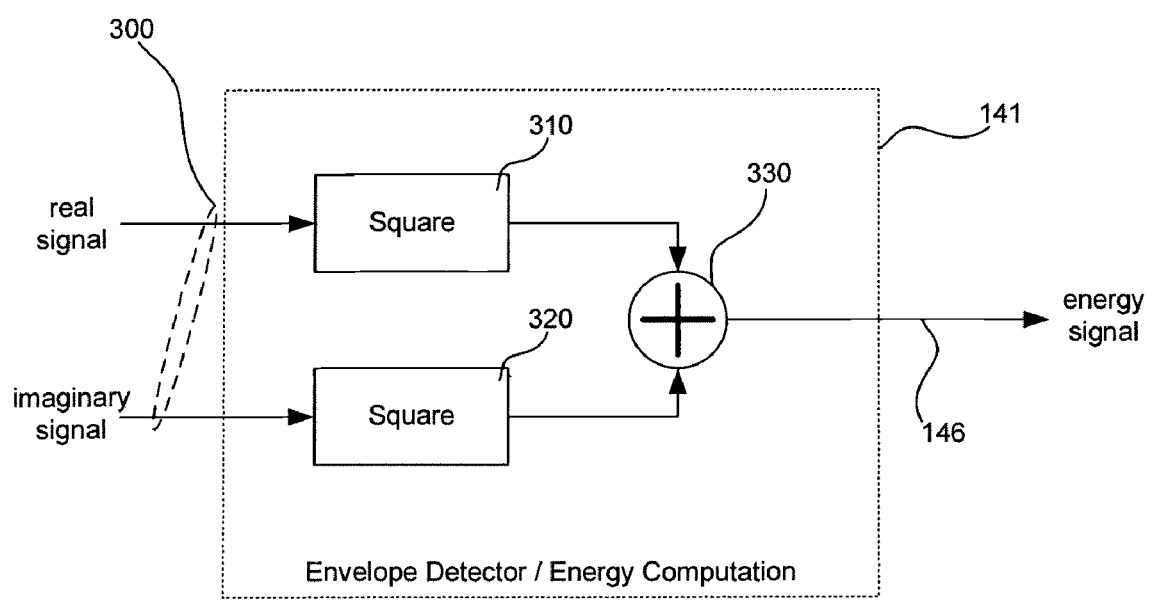
FIG. 3 is a diagram illustrating an example of an envelope detector in accordance with the present invention.

Envelope detector 141 may be referred to as an energy computation block since it computes the energy of an input complex signal. FIG. 3 shows the simple structure of envelope detector 141. The real and imaginary components of the complex baseband signal are first squared by squaring block 310 and 320, respectively. Squared output signals can now be added at the adder 330 resulting in a final energy signal 146. It should be noted that output 146 of adder 330 is a real signal. Also it should be mentioned that while passing the energy detector 141, any residual phase offset remaining in the complex baseband signal 300 may be cancelled out through the conjugate multiplication operation. The insensitivity of the TED 140 to carrier phase offset or jitter originates at energy detector 141.

Energy signal 146 can be processed in an envelope processor 149. In the examples provided in this description, an example of an envelope processor is provided that comprises one or more filters, a squarer and a decimator. However, other configurations and components of an envelope processor are contemplated.

Figure 4A:
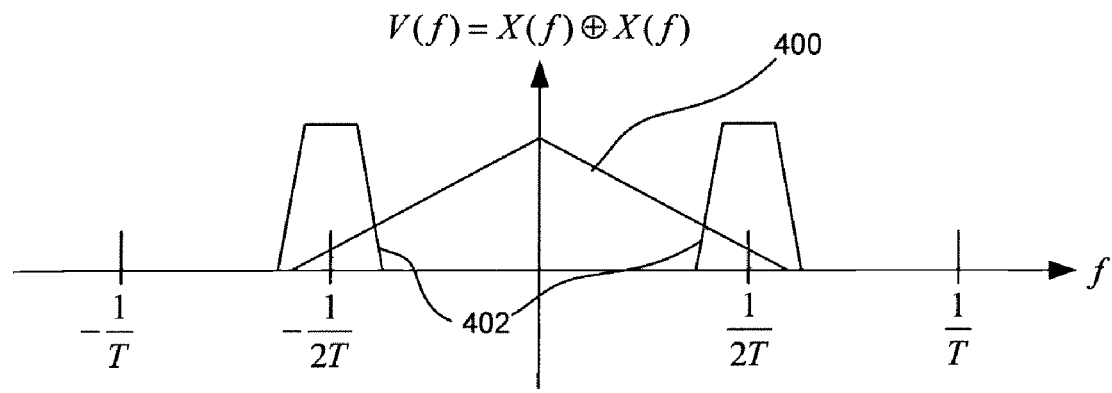
FIGS. 4A, 4B, 4C and 4D are diagrams illustrating the frequency response of an envelope signal, band pass filtered (BPF) output, squared signal of BPF output, and a high pass filtered signal, respectively.
Figure 4B:
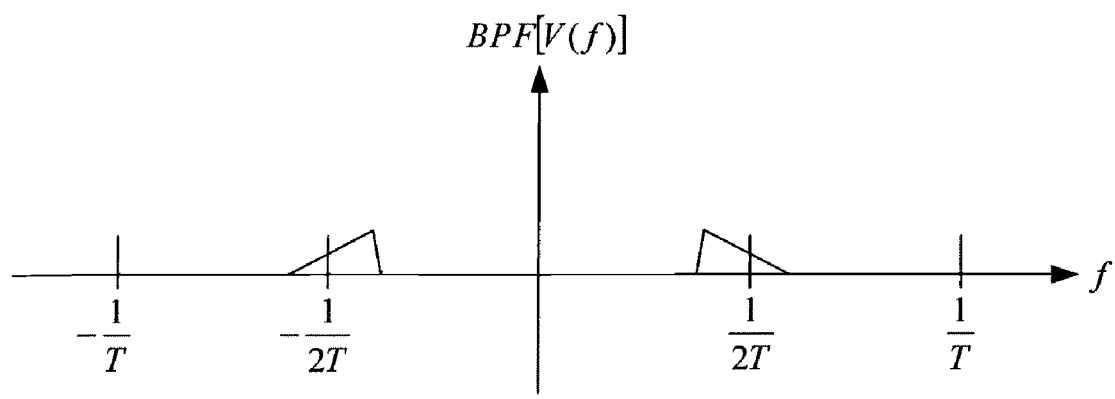

Referring now to FIGS. 1 and 4A-4C, energy signal 146 may optionally be filtered by band pass filter 142 whose pass band frequency is typically selected to be 1/(2T). FIG. 4A shows typical energy spectrum of signal v(t) 400 and BPF 142 frequency response 402. The band pass filter 142 can be implemented by a simple IIR filter with an order of one or two instead of a FIR filter. FIG. 4B illustrates the filtered signal spectrum $v_f(t)$=BPF[v(t)], which, like v(t), is a DSB signal. The filtered signal can then be provided to a squarer 143 which generates a sinusoid from the DSB signal at the symbol frequency of 1/T. It will be appreciated that a sinsusoid can be generated from a DSB signal using any of a number of methods known in the art including for example, the Gardner detector, the early-late gate detector, the Mueller-Mueller Detector, and so on[1].

[1] See, e.g., "Syncronization Techniques for Digital Receivers", Umberto Mengali and Aldo N. D'Andrea, Plenum Press, New York, 1997.

Figure 4C:
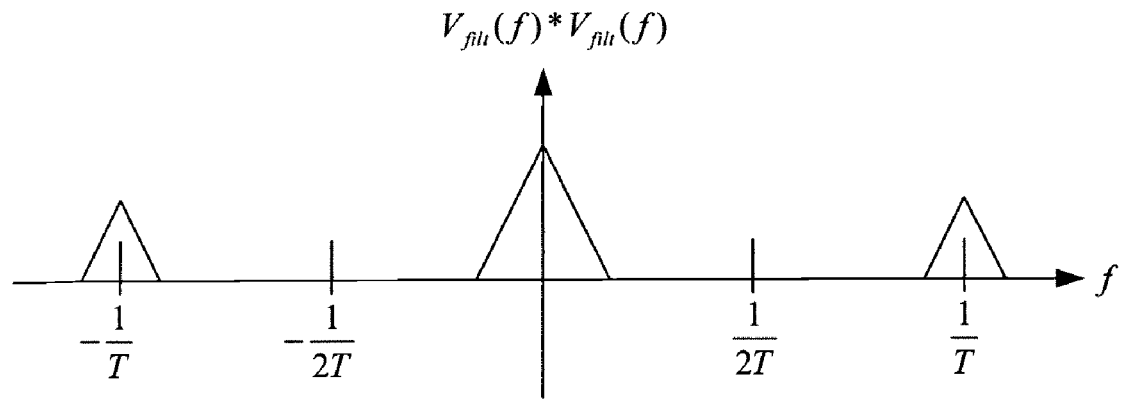
Figure 4D:
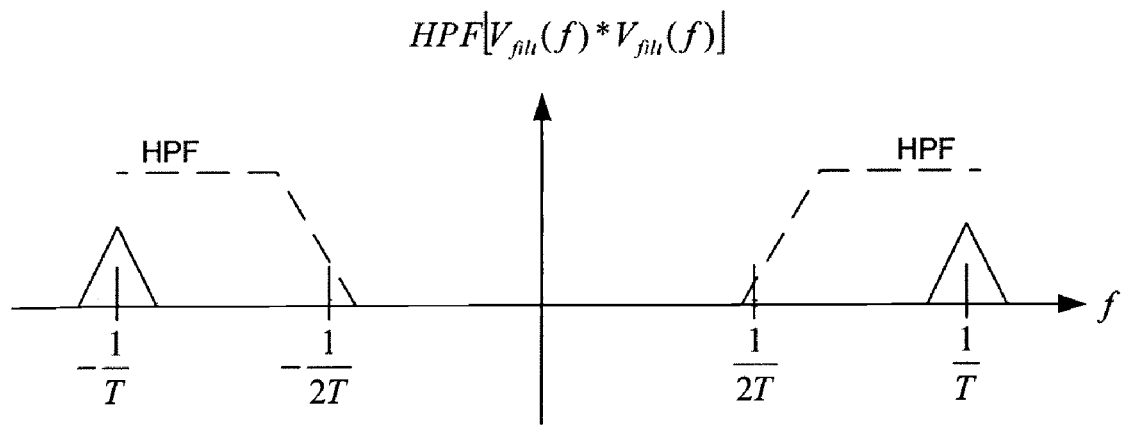

Since the filtered signal is almost a single tone signal at the frequency of 1/(2T) as illustrated in FIG. 4B, the squared signal provides both a DC component and a signal at the frequency of I/T, that is a symbol frequency. FIG. 4C indicates a typical resulting spectrum observed at the output of block 143. The DC component can be eliminated by high pass filtering operation 144. The high pass filter 144 can also be implemented using a low order IIR filter. The filtered signal is almost a tone signal at the frequency of 1/T. This tone signal is decimated by a factor of two resulting in a timing phase error 145. Consequently the error signal of TED 140 is generated at every symbol period after decimation.

Figure 5:
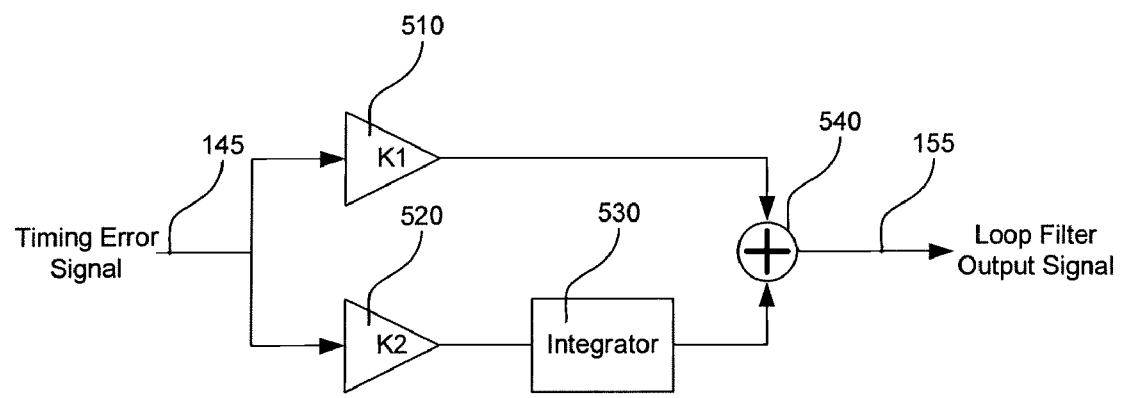
FIG. 5 is a diagram illustrating a $2^{nd}$ order loop filter structure.

The timing error signal 145 may be input to loop filter block 150 in which the signal is properly scaled and integrated. Typically, a second order loop filter is employed where proportional gain and integral gain controls the PLL parameters such as noise bandwidth and damping factor. FIG. 5 illustrates one example of a second order loop filter structure. The timing error signal 145 received from block 150 can be scaled with two scale factors K1 510 and K2 520. One of the scaled signals can be directly provided to adder 540 while the other signal may be provided to adder 540 after performing an integration operation 530. The output of the loop filter (LF) 150 may be converted into an analog signal by the D/A converter 160. Since the input signal 155 to D/A converter 160 is typically a very slowly varying signal, the operating frequency of D/A converter 160 can be set low and, or alternatively, the resolution of D/A converter 160 can be reduced. Usually a one bit D/A converter is sufficient to convert the slowly varying digital signal 155 to an analog signal 165 for block 170.

Voltage Controlled Crystal Oscillator (VCXO) 170 can have a free-running frequency of 2Fs when the analog control voltage 165 produced at the D/A converter 160 is at its midrange value. The control voltage 165 can increase or decrease the oscillation frequency of the VCXO 170 according to its amplitude and polarity. Thus when timing phase offset exists, the TED 140 can detect the error and the filtered error signal may be transformed to an analog control voltage moving the VCXO 170 to the error reducing direction.

Figure 6:
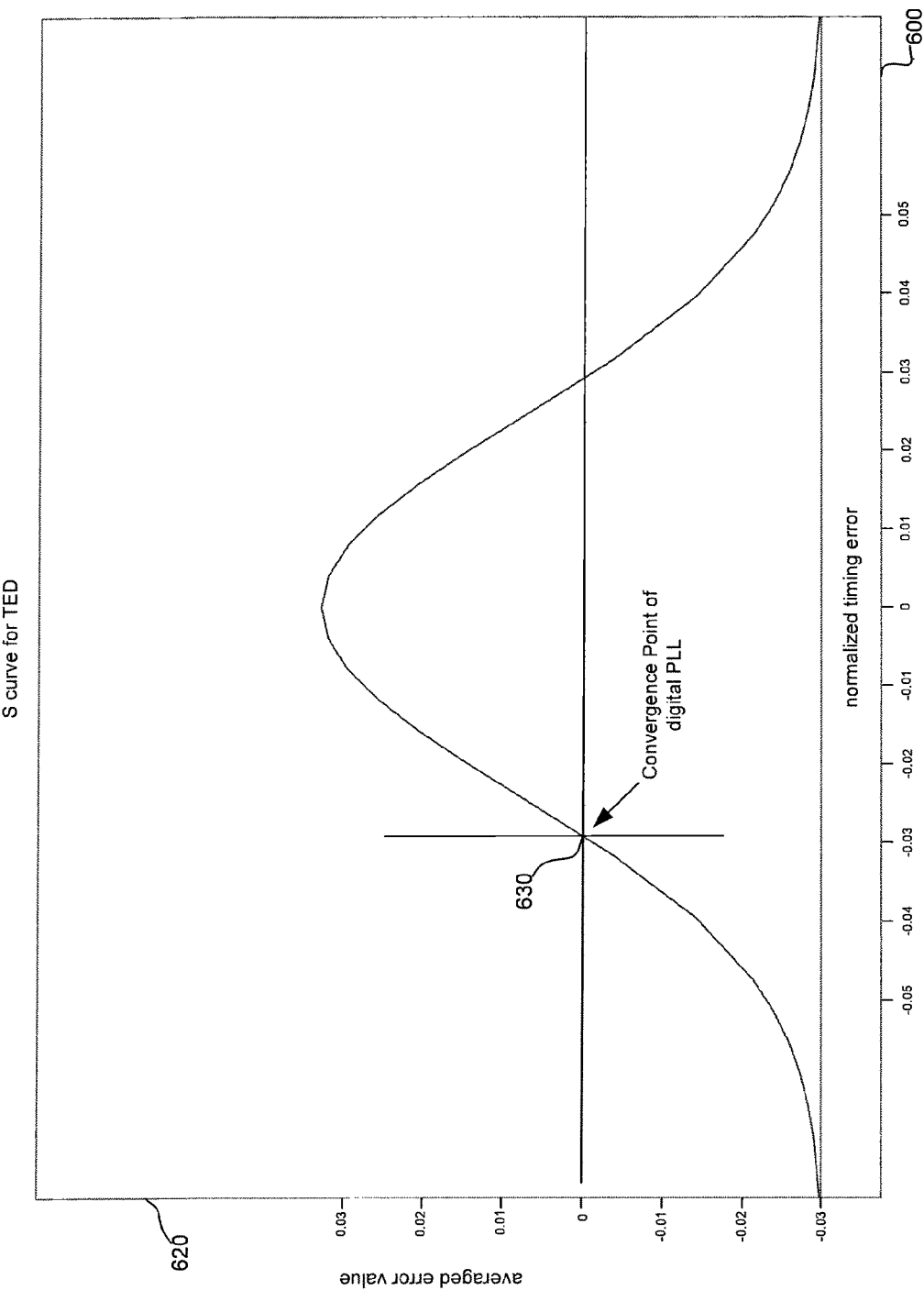
FIG. 6 is a diagram illustrating an S-curve of the TED in accordance with the present invention.

The diagram of FIG. 6 illustrates an S-curve for the TED 140 of the described example. The horizontal axis 600 indicates actual timing offset normalized by a symbol period T and the vertical axis 620 indicates detected error value. Clearly, optimal symbol timing occurs when the output of the TED 140 is at a maximum. However in a closed loop PLL system, the convergence point 630 is not at the maximum position in FIG. 6 but at a zero crossing position. If the timing recovery system is operated at 4Fs, then the potential for a problem does not exist since one of four sample positions would be the optimal symbol time if timing is recovered. However, in the system operated at 2Fs, as provided in certain embodiments, the optimal position lies between samples. Thus, a symbol cannot be selected even after the timing is perfectly recovered.

Figure 7A:
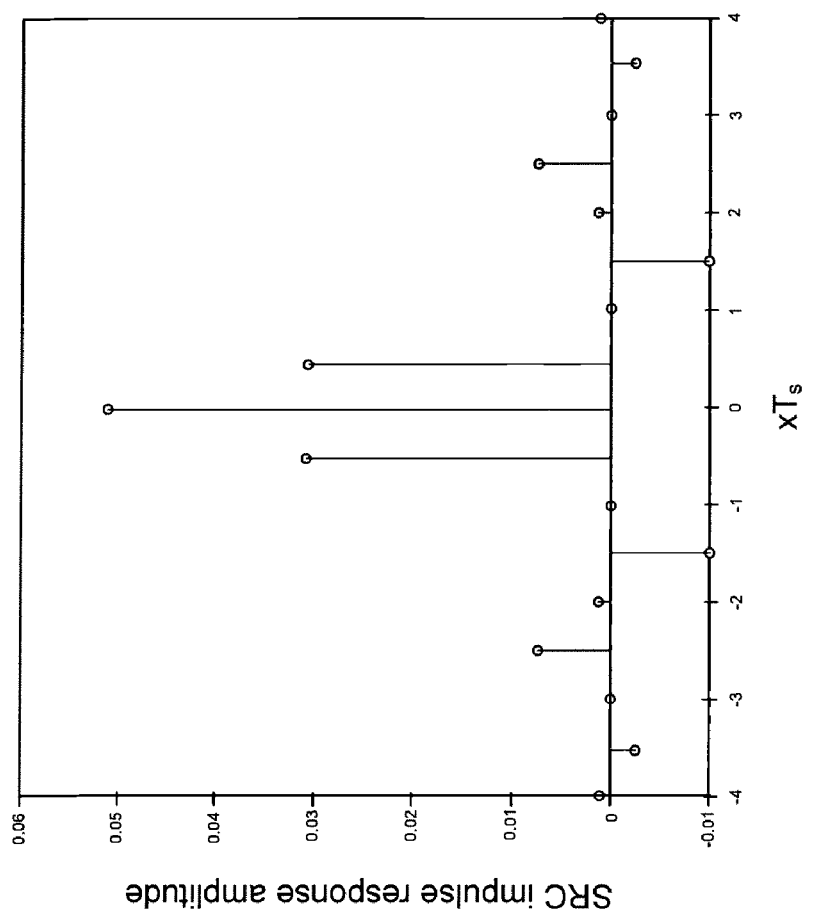
FIG. 7A, 7B are diagrams illustrating the impulse response of a conventional SRC filter and an interpolating SRC filter in accordance with the present invention, respectively.
Figure 7B:
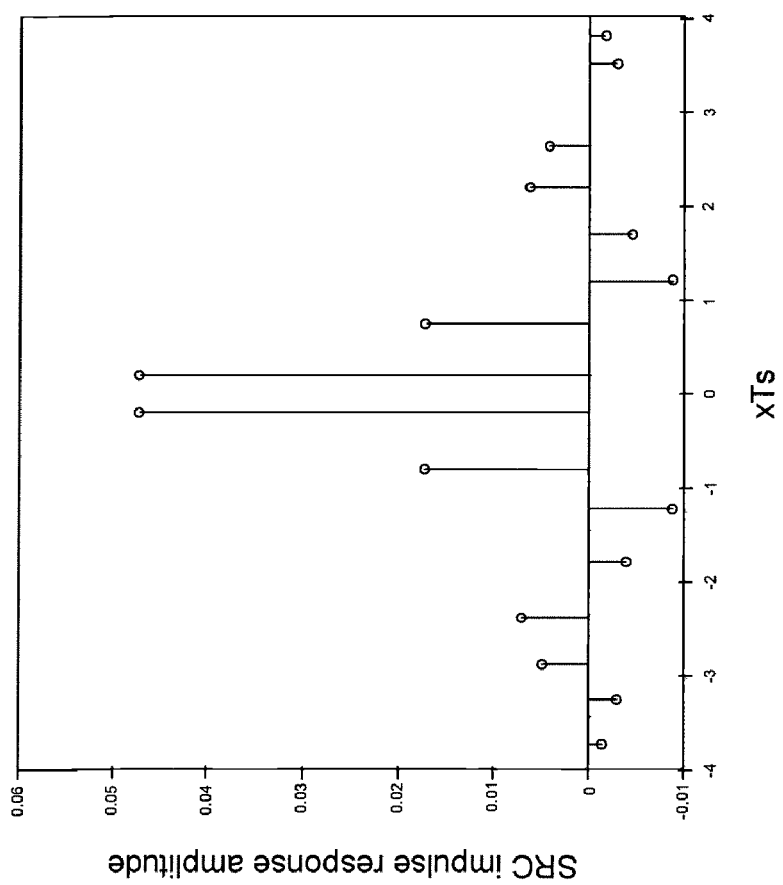

This quarter phase offset problem can be solved by optionally including interpolation in the matched filter 180 at the receiver in FIG. 1. Interpolating SRC filter 180 can perform both matched filtering and quarter symbol phase interpolation. The discrete impulse response of the SRC filter 180 with an oversampling factor of two may be intentionally sampled at t=(n/2+0.25)T from a closed form representation, as opposed to a conventional SRC filter 180 that samples at t=(n/2)T. FIGS. 7A-7B compare the impulse responses between a conventional SRC filter (FIG. 7A) and the described example of an interpolating SRC filter 180 (FIG. 7B). It will be appreciated that additional hardware may not be required to implement the interpolating SRC filter 180. The output of filter 180 is typically a 0.25T shifted and matched filtered version of filter input. The optimal symbol is one of the two samples and by decimation, the symbol can be selected and entered to post processing blocks for processing that can include equalization, Forward Error Correction (FEC), and so forth. The interpolation function described above in the matched filter may not be necessary if it can be incorporated into a post processing block such as equalization.

Scheme 2: Timing Recovery System with Pass Band Interpolation

Figure 8:
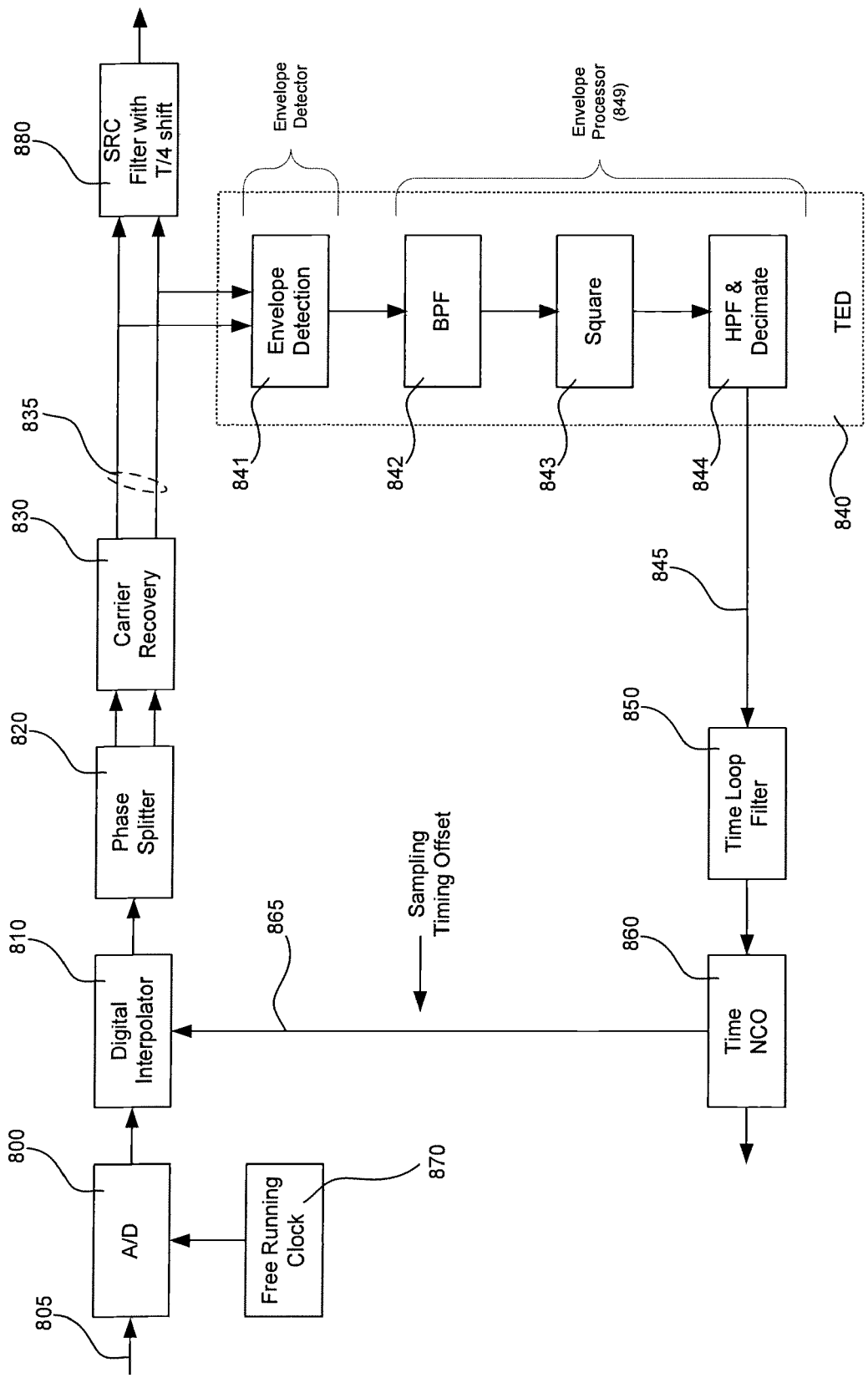
FIG. 8 is a diagram illustrating the general configuration of another exemplary embodiment of a symbol timing recovery system for VSB signals according to the present invention where the sampling instants are adjusted in the digital domain using an NCO and pass band interpolator.

Referring now to FIG. 8, another example of an embodiment of the present invention is depicted in which an analog IF signal modulated by the ATSC VSB system is sampled at a fixed sampling rate and the sampling phase is adjusted in the digital domain using a pass band interpolator. Since most of the blocks are identical with the previous scheme and explained in detail, only the substantially different aspects will be described below.

A/D converter 800 typically samples an incoming analog signal 805 at a fixed clock supplied by a free running oscillator 870. Any sampling frequency slightly larger than 2Fs is typically enough for proper operation of the system in FIG. 8. With the sampled digital data, interpolator 810 can generate an interpolated signal between input samples associated with an offset 865 provided by NCO 860. The interpolated real signal is converted into a complex signal through phase splitter 820. Carrier recovery system 830 converts the pass band input signal down to a baseband signal 835. TED 840 produces an exact timing error signal 845 regardless of carrier phase offset. TED 840 includes an envelope detector 841 and an envelope processor section 849 comprising band pass filter 842, squaring block 843 and high pass filter/decimator 844. TED 840 supplies the error signal 845 to LF 850. After proper loop filtering, the LF output is input to NCO 860. The NCO 860 integrates the error signal and determines the next sampling time and thereby next offset for interpolator 810 provided through timing offset signal 865. Quarter symbol phase offset yielded from the timing recovery PLL may be optionally compensated at the interpolating SRC filter 880. By decimating the filter output, the optimal symbol can be selected and the selected symbol can be passed to post processing blocks for processing that can include equalization, Forward Error Correction, and so forth.

Scheme 3: Timing Recovery System with Baseband Interpolation

Figure 9:
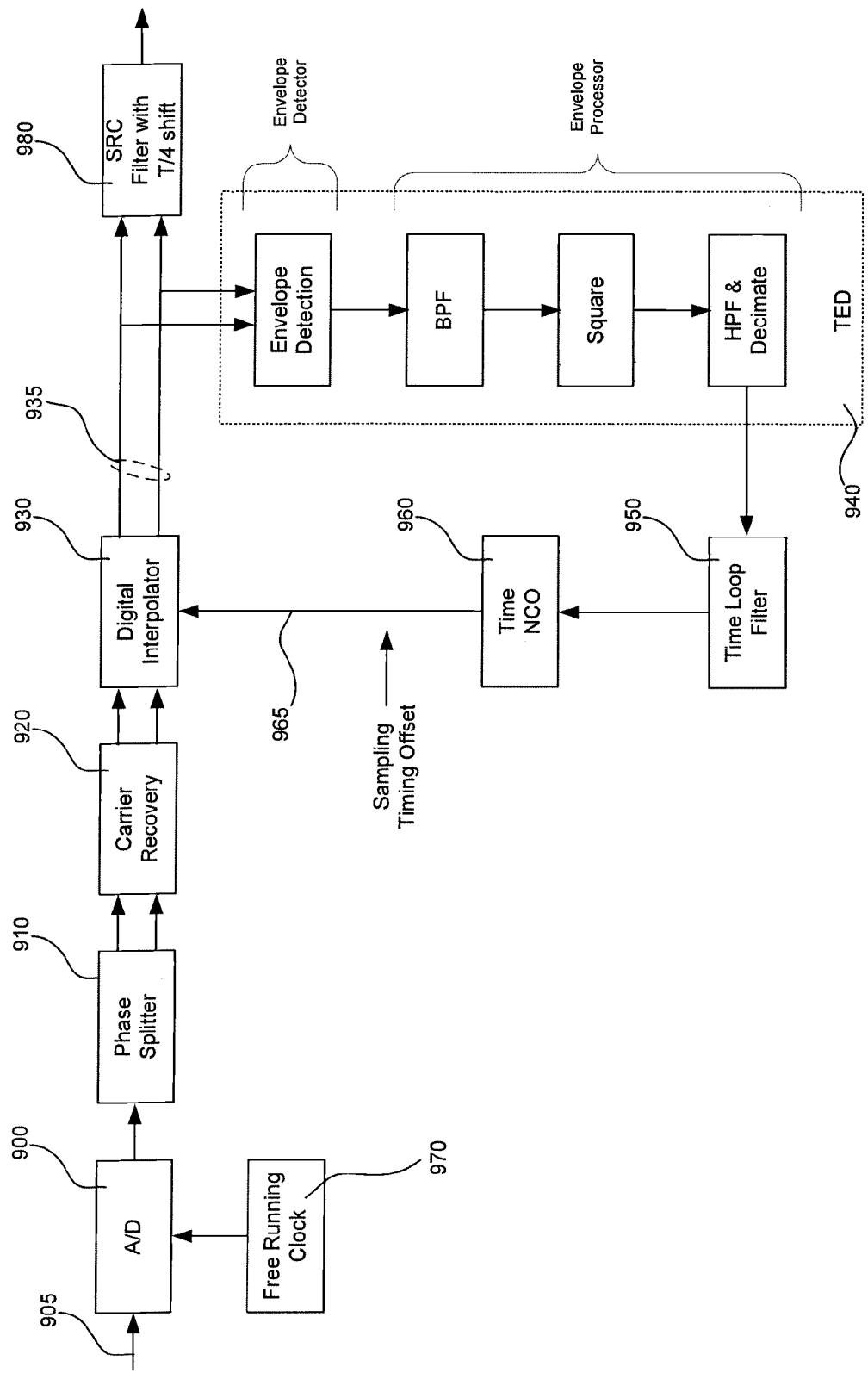
FIG. 9 is a diagram illustrating the general configuration of another exemplary embodiment of a symbol timing recovery system for VSB signals according to the present invention where, the sampling instants are adjusted in the digital domain using an NCO and baseband interpolator.

Referring to FIG. 9, another example of an embodiment of the present invention is provided in which an analog IF signal 905 modulated by ATSC VSB system can be sampled at a fixed sampling rate at A/D converter 900. The sampling phase is adjusted in digital domain using a baseband interpolator. Since most of the components in FIG. 9 are similar in structure and operation to equivalent blocks described previously, the following description discusses primarily substantially different aspects of the embodiment of FIG. 9.

A/D converter 900 may sample an incoming analog signal 905 at a fixed clock supplied by a free running oscillator 970. Any sampling frequency slightly larger than 2Fs is typically enough to ensure proper operation of the system depicted in FIG. 9. The sampled real signal can be converted into a complex signal through phase splitter 910. Carrier recovery system 920 may convert the pass band input signal down to a baseband signal. With carrier recovered complex baseband signal, the interpolator 930 can generate an interpolated signal 935 between input samples associated with an offset 965 provided by NCO 960. Complex interpolation can be implemented with two real interpolators, each of which is responsible for interpolating real and imaginary signals.

TED 940 typically produces an exact timing error signal regardless of carrier phase offset and can provide the error signal to LF 950. After proper loop filtering, output of LF 950 may be input to NCO 960. The NCO 960 can integrate an error signal and determine the next sampling time and next offset for interpolator 930, provided through timing offset signal 965. Quarter symbol phase offset incurred by the timing recovery system may be optionally compensated at interpolating SRC filter 980. By decimating the filter output, the optimal symbol can be selected and the selected symbol may be passed to post processing block for processing that can include equalization, forward error correction, and so forth.

Additional Descriptions of Certain Aspects of the Invention

Embodiments of the invention provide systems and methods for recovering timing that comprise an interpolator configured to provide an interpolated signal representative of a Vestigial Side Band ("VSB") signal wherein the interpolated signal includes inter-sample interpolations of a digital representation of the VSB signal; and a timing error detector configured to receive a complex representation of the interpolated signal and to generate a timing error signal, wherein the timing error signal is unaffected by carrier phase offset. In some embodiments, the timing error detector comprises an envelope detector and an envelope processor section that can include one or more filters, a squarer and a decimator. In some of these embodiments, the envelope detector computes energy in the complex representation of the VSB signal. In some of these embodiments, the complex representation of the VSB signal is a baseband representation of the VSB. In some of these embodiments, the energy is computed using conjugate multiplication of real and imaginary components of the complex representation of the VSB signal. In some of these embodiments, the timing error detector is insensitive to carrier phase offset and jitter. In some of these embodiments, the one or more filters include a band pass filter and a high pass filter and further comprising a signal squarer. In some of these embodiments, the timing error signal is generated at each of a plurality of symbol periods. In some of these embodiments, wherein the inter-sample interpolations are associated with an offset provided by an NCO responsive to the timing error signal. In some of these embodiments, the interpolator receives a complex baseband representation of the VSB signal. In some of these embodiments, the systems and methods further comprise a phase splitter, the phase splitter receiving the interpolated signal, wherein a carrier signal is recovered from the output of the phase splitter to provide the complex baseband representation of the VSB signal. In some of these embodiments, the systems and methods further comprise a matched filter configured to compensate for a quarter symbol offset. In some of these embodiments, Embodiments of the invention provide systems and methods for recovering timing, comprising: a timing error detector configured to generate an error signal representative of timing error in a digitized signal, wherein the timing error detector includes an envelope detector; an A/D converter configured to digitize a Vestigial Side Band ("VSB") signal at a sampling rate determined by the error signal; and a phase splitter that receives an output of the A/D converter and provides a complex VSB signal representative of the VSB signal, wherein the timing error signal receives a complex baseband VSB signal obtained by removing a carrier signal from the complex VSB signal. In some of these embodiments, timing error detector comprises an envelope processor section that optionally includes one or more of high pass filters, band pass filters, squarers and decimators. In some of these embodiments, the timing error detector further includes a band pass filter and a high pass filter. In some of these embodiments, the envelope detector conjugate multiplication of real and imaginary components of the complex baseband VSB signal to obtain a measurement of energy in the VSB signal.

Embodiments of the invention provide systems and methods for phase independent timing error detection that comprise the steps of digitizing a Vestigial Side Band ("VSB") signal in a digitizer configured to sample the VSB signal at a selected sampling rate; providing a complex baseband VSB signal, wherein providing the complex baseband VSB signal includes removing a carrier signal from the complex VSB signal and splitting the digitized VSB signal into complex components; and generating a time error signal based on the complex VSB signal in a time error detector, wherein the time error detector includes an envelope detector, and an envelope processor that can include a signal squarer and two or more filters. In some of these embodiments, the step of providing a complex baseband signal further includes obtaining an interpolated signal between samples of the VSB signal associated with an offset determined by the time error signal. In some of these embodiments, the step of providing a complex baseband VSB signal occurs prior to the step of obtaining an interpolated signal. In some of these embodiments, the step of obtaining an interpolated signal occurs prior to the step of providing a complex baseband VSB signal. In some of these embodiments, the sampling rate is selected based on the time error signal.

Embodiments of the invention provide systems and methods for use in VSB receivers that comprise an A/D converter for sampling analog input signals, a phase splitter to convert sampled input signal to complex signal, a carrier recovery means to recover the carrier, a timing recovery means to recover the symbol timing, and a matched filter, wherein the phase independent timing error detection means for the said time recovery means comprises an envelope detector which performs conjugate multiplication of the complex signal and an envelope processor. Envelope processor may include a squarer, a high pass filter, and a decimator to sample the out of HPF at symbol rate. In some of these embodiments, the timing recovery means also includes a time loop filter, a D/A converter and a VCXO configured to control the A/D converter. In some of these embodiments, the timing recovery means of claim 1 further includes a time loop filter, a NCO, a digital interpolator between the A/D converter and the phase splitter and a free running clock for the A/D converter. In some of these embodiments, the timing recovery loop further includes a time loop filter, an NCO, a digital interpolator between carrier recovery means and the matched filter and a free running clock for the A/D converter. In some of these embodiments, the timing error detector further includes a band pass filter between the output of the envelope detector and the squarer. In some of these embodiments, the matched filter further includes means for quarter symbol offset.

Embodiments of the invention provide systems and methods for use in a VSB receiver that comprises an A/D converter for sampling analog input signals, a phase splitter to convert sampled input signal to complex signal, a carrier recovery means to recover the carrier, a timing recovery means to recover the symbol timing, and a matched filter. In some of these embodiments, also included is an envelope detector which performs conjugate multiplication of the complex signal, a squarer, a high pass filter, a decimator to sample the out of HPF at symbol rate. In some of these embodiments, timing recovery means further includes a time loop filter filtering output of TED a D/A converter, and a VCXO to control the said A/D converter. In some of these embodiments, the timing recovery means further includes a time loop filter filtering output of TED, a NCO, a digital interpolator between the A/D converter and the phase splitter and a free running clock for the A/D.

In some of these embodiments, the timing recovery means further includes a time loop filter filtering output of TED, a NCO, a digital interpolator between carrier recovery means and the matched filter and a free running clock for the A/D converter. In some of these embodiments, the timing error detector further includes a bandpass filter to filter the output of the envelope detector. In some of these embodiments, the matched filter compensates for quarter symbol offset.

Although the present invention has been described with reference to preferred embodiments, workers skilled in the art will recognize that changes may be made in form and detail without departing from the spirit and scope of the invention. Accordingly, the disclosure of the present invention is intended to be illustrative of, but not limiting to, the scope of the invention, which is set forth in the following claims.

What is claimed is:

1. A timing error detector for a vestigial side band ("VSB") comprising
an envelope detector, and
an envelope processor, wherein:
the envelope detector receives a complex baseband signal derived from a VSB signal and calculates energy of the complex baseband signal; and the envelope processor receives the energy calculation from the envelope detector and generates an error signal representative of a phase error in the complex baseband signal.

2. The timing error detector of claim 1, wherein the envelope detector comprises a first signal squarer and the envelope processor comprises a second signal squarer.

3. The timing error detector of claim 2, wherein the envelope processor further comprises a high pass filter.

4. The timing error detector of claim 2, wherein the envelope processor further comprises a decimator.

5. The timing error detector of claim 1, wherein the envelope detector performs conjugate multiplication of the complex baseband signal.

6. A method for phase independent timing error detection comprising the steps of:
    digitizing a Vestigial Side Band ("VSB") signal in a digitizer configured to sample the VSB signal at a selected sampling rate;
    providing a complex baseband VSB signal, wherein providing the complex baseband VSB signal includes removing a carrier signal from the complex VSB signal and splitting the digitized VSB signal into complex components; and
    generating in a timing error detector, a time error signal based on the complex VSB signal wherein the timing error detector includes an envelope detector and an envelope processor.

7. The method of claim 6, wherein the step of providing a complex baseband signal further includes obtaining an interpolated signal between samples of the VSB signal associated with an offset determined by the time error signal.

8. The method of claim 7, wherein the step of providing a complex baseband VSB signal occurs prior to the step of obtaining an interpolated signal.

9. The method of claim 7, wherein the step of obtaining an interpolated signal occurs prior to the step of providing a complex baseband VSB signal.

10. The method of claim 6, wherein the sampling rate is selected based on the time error signal.

11. The timing error detector of claim 1, wherein the error signal includes a timing error signal generated from a complex representation of an interpolated signal.

12. The timing error detector of claim 11, wherein the interpolated signal is representative of a Vestigial Side Band ("VSB") signal.

13. The timing error detector of claim 11, wherein the timing error signal is unaffected by phase offset in a carrier signal.

14. The timing error detector of claim 13, wherein the timing error signal is unaffected by jitter in the carrier signal.

15. The timing error detector of claim 11, wherein the timing error signal is unaffected by jitter in the carrier signal.

16. The timing error detector of claim 1, wherein the error signal is unaffected by carrier phase offset.

17. The timing error detector of claim 1, wherein the error signal is unaffected by jitter.

18. The timing error detector of claim 1, wherein the error signal is unaffected by carrier phase offset and jitter.

19. The method of claim 6, wherein generating the timing error signal includes squaring an input signal of the envelope detector.

20. The method of claim 6, wherein generating the timing error signal includes bandpass filtering an output of the envelope detector.

21. The method of claim 20, wherein generating the timing error signal includes squaring the bandpass filtered output.

22. The method of claim 21, wherein generating the timing error signal includes high pass filtering and decimating the squared, bandpass filtered output.

23. The method of claim 22, wherein generating the timing error signal includes squaring an input signal provided to the envelope detector.

24. The method of claim 6, wherein generating the timing error signal includes a first squaring step performed in the envelope detector and a second squaring step performed in the envelope processor.

* * * * *